(12) United States Patent
Han et al.

(10) Patent No.: US 10,003,408 B2
(45) Date of Patent: Jun. 19, 2018

(54) RECEIVING METHOD AND RECEIVER DEVICE FOR A COHERENT OPTICAL COMMUNICATION SYSTEM

(71) Applicant: INDUSTRY-ACADEMIC COOPERATION FOUNDATION, YONSEI UNIVERSITY, Seoul (KR)

(72) Inventors: Sang Kook Han, Seoul (KR); Kyoung Hak Mun, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 180 days.

(21) Appl. No.: 15/000,213

(22) Filed: Jan. 19, 2016

(65) Prior Publication Data

US 2016/0241344 A1    Aug. 18, 2016

(30) Foreign Application Priority Data

Jan. 19, 2015 (KR) .......................... 10-2015-0008778

(51) Int. Cl.
*H04B 10/00* (2013.01)
*H04B 10/61* (2013.01)

(52) U.S. Cl.
CPC ................... *H04B 10/615* (2013.01)

(58) Field of Classification Search
CPC .... H04B 10/63; H04B 10/611; H04B 10/612; H04B 10/613; H04B 10/142; H04B 10/61; H04B 10/64; H04B 10/614; H04B 10/615; H04B 10/6151; H04B 10/6162; H04B 10/6166

USPC .................................................. 398/202–212
See application file for complete search history.

(56) References Cited

U.S. PATENT DOCUMENTS

| | | | | |
|---|---|---|---|---|
| 2004/0114939 A1* | 6/2004 | Taylor | .................... | H04B 10/61 398/152 |
| 2010/0046961 A1* | 2/2010 | Tanimura | .................. | H03F 3/08 398/159 |
| 2011/0026923 A1* | 2/2011 | Kim | .......................... | H01S 5/50 398/79 |

(Continued)

OTHER PUBLICATIONS

Adhikari et al; Self-Coherent Optical OFDM: An Iteresting Alternative to Direct or Coherent Detection; 2011, IEEE, pp. 1-4.*

(Continued)

*Primary Examiner* — Amritbir Sandhu
(74) *Attorney, Agent, or Firm* — Ladas & Parry LLP

(57) ABSTRACT

A receiver device and receiving method for a coherent optical communication system are disclosed. The disclosed device includes: an optical splitter configured to split a received optical signal into at least two paths; a first amplifier configured to amplify a second optical signal from among a first optical signal and the second optical signal split into two paths; a second amplifier configured to amplify the output signal of the first amplifier; and a coherent receiver module configured to mix and detect the output signal of the second amplifier and the first optical signal. The disclosed device provides the advantages of suppressing the occurrence of frequency offsets and minimizing phase noise, as well as allowing manufacture with a low cost without requiring either an additional optical source or additional optical fibers.

3 Claims, 5 Drawing Sheets

(56) References Cited

U.S. PATENT DOCUMENTS

| | | | |
|---|---|---|---|
| 2011/0097075 A1* | 4/2011 | Tanimura | H04B 10/07953 398/1 |
| 2012/0027404 A1* | 2/2012 | Secondini | H04B 10/6165 398/25 |
| 2013/0070254 A1* | 3/2013 | Winzer | H04J 14/02 356/478 |
| 2013/0170843 A1* | 7/2013 | Baney | H04B 10/61 398/212 |
| 2014/0193152 A1* | 7/2014 | Zhou | H04B 10/614 398/72 |

OTHER PUBLICATIONS

Adhikari et al; Self-coherent Optical OFDM: An interesting Alternative to Direct or Coherent Detection; 2011; IEEE; pp. 1-4.*
Giacoumidis et al; On-chip carrier recovery for coherent optical communications using Brilouin filtering; 2017; pp. 1,2.*
Adhikari et al; Stablization of Self-coherent OFDM with Injection Locked laser; 2012; IEEE; pp. 1-4.*

* cited by examiner

RECEIVING METHOD AND RECEIVER DEVICE FOR A COHERENT OPTICAL COMMUNICATION SYSTEM

CROSS-REFERENCE TO RELATED APPLICATIONS

This application claims the benefit of Korean Patent Application No. 10-2015-0008778, filed with the Korean Intellectual Property Office on Jan. 19, 2015, the disclosure of which is incorporated herein by reference in its entirety.

BACKGROUND

1. Technical Field

Embodiments of the present invention relate to a receiver device in an optical communication system, more particularly to a receiver device employed in an optical communication system that utilizes a coherent method.

2. Description of the Related Art

The current optical communication system uses an IM-DD method with which the transmitter unit converts an electrical signal into an optical signal and then directly applies intensity modulation (IM) before transmitting the signal, and the receiver unit applies direct detection (DD) on the received optical signal.

While the capacity of data transmissions for broadband total communication networks in future applications is expected to range from hundreds of gigabytes per second to tens of terabytes per second or even higher, the IM-DD method may not be easy to apply systems having a transmission capacity of 10 Gb/s or higher, because it does not allow phase modulation, so that the efficiency of bandwidth use is low, and the reception sensitivity is also low.

Due to such requirements, coherent optical communication is again gaining interest, as it allows improved reception sensitivity by mixing a local oscillator signal with a received signal and allows improved bandwidth efficiency through phase modulation.

In order to utilize coherent optical communication in practical applications for high-capacity, long-distance communication, the spectral linewidth of the semiconductor laser used for the optical sources in the transmitter and local oscillator must be very narrow, and the central frequency must be stable.

Also, in order to perform coherent optical communication in a stable manner, the frequency of the received optical signal and the frequency of the local oscillator signal must be the same, with precise phase control required between the two signals.

However, due the surrounding environment, physical properties, etc., it is virtually impossible to prepare two optical sources (e.g. laser diodes) that emit completely identical frequencies. Therefore, a frequency offset occurs between the local oscillator signal and the received optical signal.

Also, the phase may randomly change due to the properties of the laser diode having a linewidth, resulting in the occurrence of phase noise which distorts signals.

Therefore, the receiver device in a coherent optical communication system may require an additional technique for precisely controlling the frequencies and phases of two different optical sources or for compensating the distortions.

To address the problems above, the self-homodyne coherent optical communication system was proposed. The self-homodyne coherent optical communication system has the transmitter device divide the optical carrier and provide the optical source that will be used for the local oscillator in the coherent receiver.

However, the existing self-homodyne coherent optical communication system requires additional optical fibers for transmitting the optical source from the transmitter device for use as the local oscillator signal, so that the efficiency is lowered and the cost is increased due to the installing of the optical fibers.

SUMMARY OF THE INVENTION

One aspect of the present invention is to provide a receiver device for a coherent optical communication system that can suppress the occurrence of frequency offsets and minimize phase noise.

Another aspect of the present invention is to provide a receiver device for a coherent optical communication system that can be manufactured with a low cost without requiring either an additional optical source or additional optical fibers.

An aspect of the present invention provides a receiver device for a coherent optical communication system that includes: an optical splitter configured to split a received optical signal into at least two paths; a first amplifier configured to amplify a second optical signal from among a first optical signal and the second optical signal split into two paths; a second amplifier configured to amplify the output signal of the first amplifier; and a coherent receiver module configured to mix the output signal of the second amplifier and the first optical signal and perform detection on the mixed signal.

The first amplifier may amplify the second optical signal such that the minimum value of the output signal is within the saturation region of the second amplifier.

The second amplifier may output a signal similar to a uniform signal.

The first amplifier and the second amplifier may include a semiconductor optical amplifier (SOA).

Another aspect of the present invention provides a receiver device for a coherent optical communication system that includes: an optical splitter configured to split a received optical signal into at least two paths; an amplifier configured to amplify a second optical signal from among a first optical signal and the second optical signal split into two paths; and a coherent receiver module configured to mix an output signal of the amplifier and the first optical signal and perform detection on the mixed signal.

Still another aspect of the present invention provides a receiving method in a coherent optical communication system that includes: (a) splitting a received optical signal into at least two paths; (b) amplifying a second optical signal from among a first optical signal and the second optical signal split into two paths; (c) amplifying an output signal resulting from said step (b); and (d) mixing an output signal resulting from said step (c) and the first optical signal and performing detection on the mixed signal.

An embodiment of the invention can provide the advantages of suppressing the occurrence of frequency offsets and minimizing phase noise, as well as allowing manufacture with a low cost without requiring either an additional optical source or additional optical fibers.

Additional aspects and advantages of the present invention will be set forth in part in the description which follows,

DETAILED DESCRIPTION OF THE INVENTION

Figure 1:
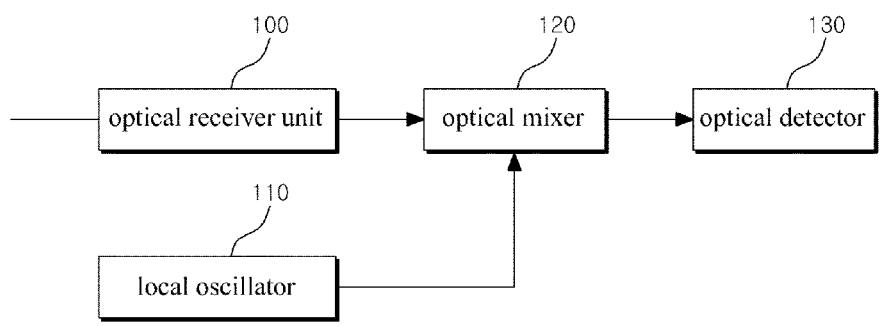
FIG. 1 is a block diagram illustrating the structure of a receiver device for a coherent optical communication system according to the related art.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

FIG. 1 is a block diagram illustrating the structure of a receiver device for a coherent optical communication system according to the related art.

Referring to FIG. 1, a receiver device in a coherent optical communication system based on the related art may include an optical receiver unit 100, a local oscillator 110, an optical mixer 120, and an optical detector 130.

The optical receiver unit 100 may receive optical signals transmitted from outside. An optical signal can be received through an optical transmission line such as an optical cable.

The local oscillator 110 may serve to generate a separate optical signal that has the same frequency as that of the received signal. The local oscillator signal generated at the local oscillator 110 is a signal that does not include a data component and only has the same frequency as that of the received signal.

The received optical signal and the local oscillator signal generated at the local oscillator 110 may be mixed through the optical mixer 120. The optical mixer 120 may perform the mixing such that the received optical signal and the local oscillator signal of the local oscillator 110 are summed together.

When the optical mixing is performed at the optical mixer, the optical detector 130 may perform detection on the mixed optical signal. A typical photodetector can be used for the optical detector. The optical detector 130 may convert the optical signal into an electrical signal, and the coherent optical system's receiver device can perform additional signal processing on the converted electrical signal.

Although it is not shown in FIG. 1, a polarization splitter for splitting the received optical signal and the local oscillator signal according to polarization components can be used additionally.

As illustrated in FIG. 1, the receiver device of a conventional coherent optical communication system requires a separate local oscillator 110. Although the frequency of the local oscillator signal of the local oscillator 110 and the frequency of the received optical signal must be identical, it is difficult in actual practice to generate a local oscillator signal that has the same frequency as the received signal. As a result, a frequency offset may occur between the received optical signal and the local oscillator signal, causing distortions in the signal.

Moreover, as the receiver device of the conventional coherent optical communication system requires a separate local oscillator, there is also the problem of increased manufacturing costs.

Figure 2:
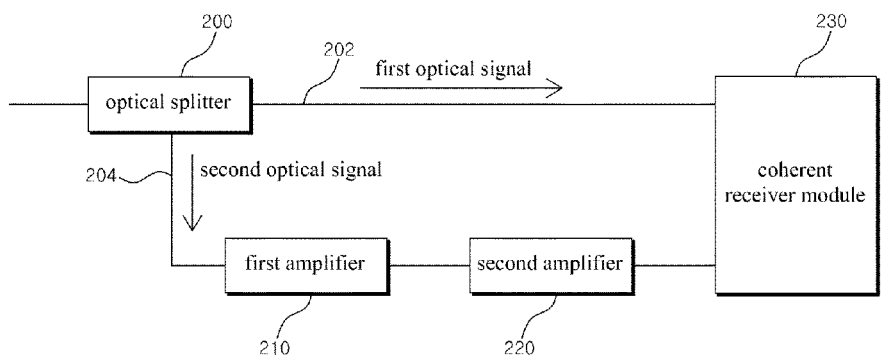
FIG. 2 is a block diagram illustrating the structure of a receiver device for a coherent optical communication system according to an embodiment of the invention.

FIG. 2 is a block diagram illustrating the structure of a receiver device for a coherent optical communication system according to an embodiment of the invention.

Referring to FIG. 2, a receiver device for a coherent optical communication system according to an embodiment of the invention may include an optical splitter 200, a first amplifier 210, a second amplifier 220, and a coherent receiver module 230.

The optical splitter 200 may be joined with an optical cable for transmitting a coherent optical signal that is transmitted from the transmission end, and may serve to split a received signal into two paths: a first path 202 and a second path 204. The intensities of the first optical signal split to the first path 202 and the second optical signal split to the second path 204 can be controlled by the optical splitter 200.

The first optical signal split to the first path 202 may be inputted to the coherent optical receiver module 230 without separate processing.

The second optical signal split to the second path 204 may be inputted to the first amplifier 210. The first amplifier 210 may amplify the second optical signal such that the smallest signal of the second optical signal is greater than or equal to a preconfigured signal level. According to an embodiment of the invention, the first amplifier 210 can include a semiconductor optical amplifier (SOA).

Figure 3:
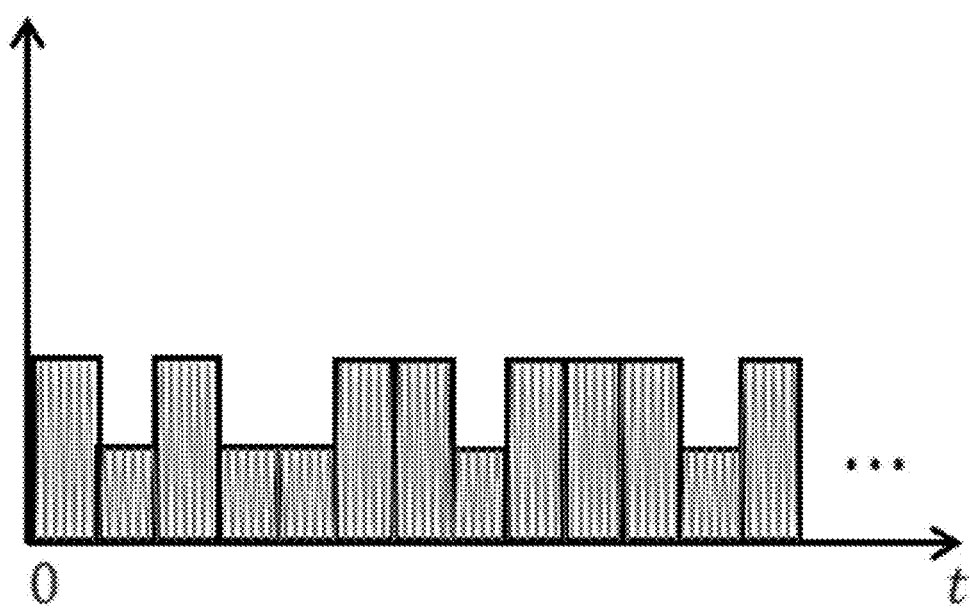
FIG. 3 illustrates the waveform of an optical signal inputted into a first amplifier in a coherent optical communication system according to an embodiment of the invention.

FIG. 3 illustrates the waveform of an optical signal inputted into the first amplifier in a coherent optical communication system according to an embodiment of the invention.

Referring to FIG. 3, the second optical signal inputted to the first amplifier 210 may have multiple signal levels. The intensity of the second optical signal can be adjusted by the optical splitter 200. The amplification factor of the first amplifier may be determined based on the saturation region of the second amplifier. To be more specific, the amplification factor of the first amplifier may be configured such that the output signal level of the first amplifier is within the saturation region of the second amplifier.

An amplifier performs amplification linearly in a particular input signal level region, but when the input signal level exceeds a particular threshold, the amplification is no longer linear. Such signal level region in which the amplification is not performed linearly is referred to as the saturation region, and the first amplifier 210 may amplify the input signal such that the output signal level of the first amplifier 210 belongs to the saturation region of the second amplifier 220.

Figure 4:
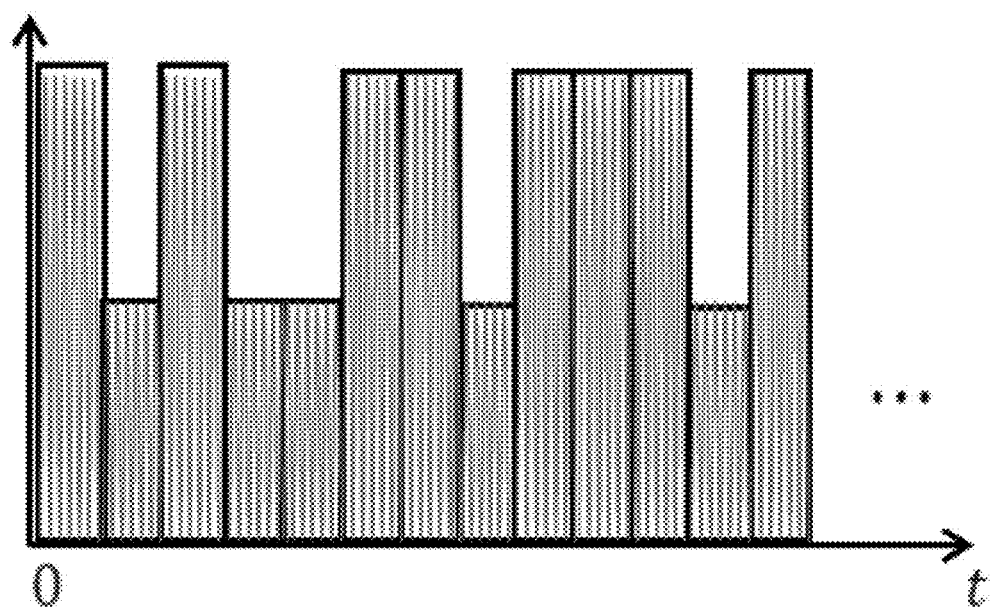
FIG. 4 illustrates the output waveform of the first amplifier in a coherent optical communication system according to an embodiment of the invention.

FIG. 4 illustrates the output waveform of the first amplifier in a coherent optical communication system according to an embodiment of the invention.

FIG. 4 shows signal level plotted against time, and due to the limit on the amplifier's amplification factor, the output signal does not exceed a predetermined threshold.

As described above, the first amplifier 210 may perform the amplification such that the minimum value of the output signal belongs to the saturation region of the second amplifier. To configure the amplification factor of the first amplifier 210, it may be necessary to predict the minimum value of the optical signal.

Figure 5:
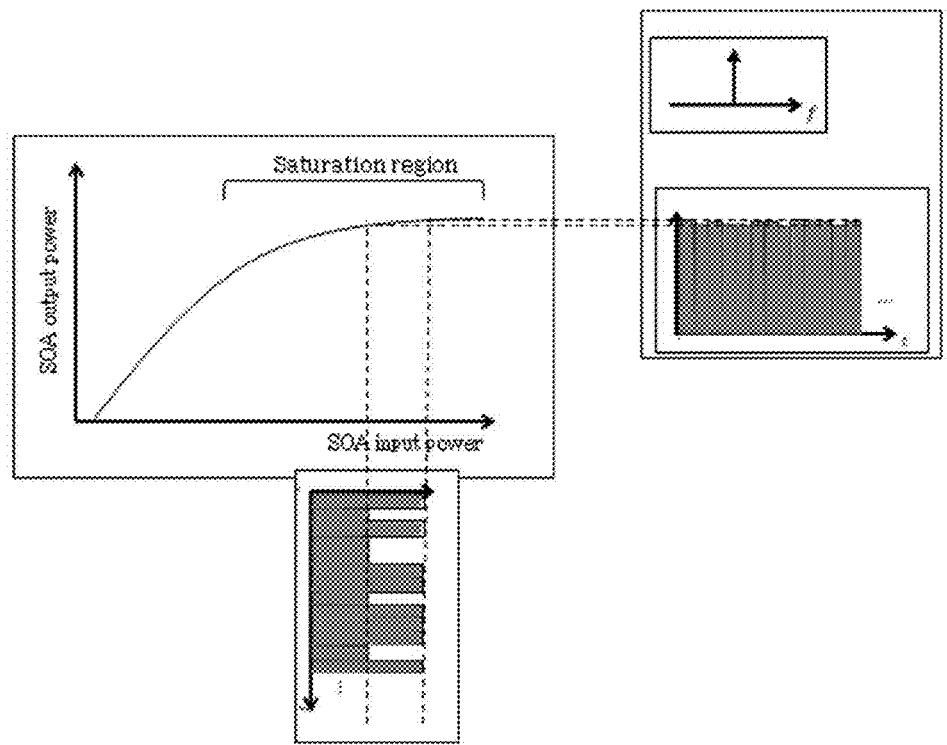
FIG. 5 illustrates the output waveform of the second amplifier in a coherent optical communication system according to an embodiment of the invention.

FIG. 5 illustrates the output waveform of the second amplifier in a coherent optical communication system according to an embodiment of the invention.

Referring to FIG. 5, the output of the first amplifier 210 according to an embodiment of the invention, such as that shown in FIG. 4, may be inputted to the input end of the second amplifier 220. In FIG. 5, it can be seen that the output signal of the first amplifier 210 is within the saturation region of the second amplifier.

Since the amplification is not performed linearly if the levels of the input signal entering the second amplifier 220 all belong to the saturation region, the levels of the output signals of the second amplifier 220 may be given values similar to one another. Consequently, the output signal of the second amplifier 220 may be a signal similar to a uniform signal that does not carry data, and such output signal of the second amplifier 220 may have the same form as the local oscillator signal of a local oscillator. As the output signal of the second amplifier 220 is a signal converted from the received optical signal, it has an identical frequency as that of the received optical signal, making it possible to resolve the problem of frequency offsets occurring that occurs in the conventional coherent optical receiver device.

Also, since there is no separate optical fiber needed for connecting to the transmission end, there is the advantage of lower implementation cost compared to the existing self-homodyne coherent system.

The coherent receiver module 230 may serve to mix the first optical signal split at the optical splitter 200 and the signal outputted from the second amplifier 220 and perform detection on the mixed signal. The operation of the coherent receiver module 230 may be the same as the operation of a module used in a receiver device of a typical coherent optical communication system. The coherent receiver module 230 may perform a mixing operation on the output signal of the second amplifier 220 and the first optical signal, by adopting the output signal of the second amplifier 220 as a local oscillator signal, and may perform an optical detection operation of converting the mixed signal into an electrical signal.

Although FIG. 2 illustrates a structure in which two amplifiers 210, 220 are used for the amplification, the skilled person would readily understand that a signal similar to a uniform signal can be outputted with just one amplifier if the intensity of the second optical signal is sufficiently great.

In cases where only one amplifier is used, the level of the inputted second optical signal should be greater than or equal to a preconfigured threshold, and preferably, the level of the second optical signal should be within the saturation region of the amplifier used. The output signal of this amplifier may have a form similar to a uniform signal, as is the case for the output signal of the second amplifier in FIG. 2.

Figure 6:
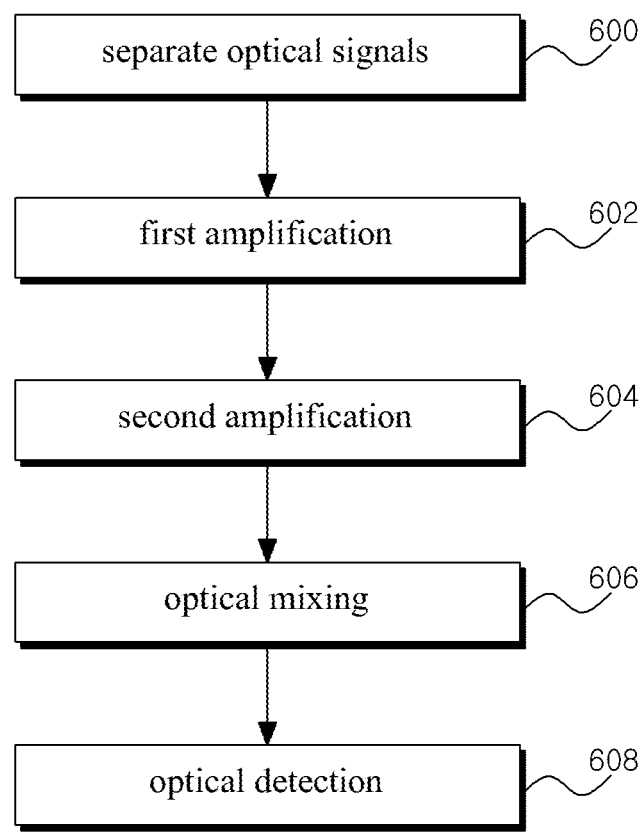
FIG. 6 is a flow diagram illustrating the operation of a receiver device for a coherent optical communication system according to an embodiment of the invention.

FIG. 6 is a flow diagram illustrating the operation of a receiver device for a coherent optical communication system according to an embodiment of the invention.

Referring to FIG. 6, a received optical signal may be split into two paths (step 600). The splitting of the received optical signal can be performed by an optical splitter, and the first optical signal and second optical signal thus split may be processed independently.

From among the split signals, a first amplification may be performed on the second optical signal by using a first amplifier (step 602). The first amplifier may perform the amplification such that the minimum value of the output power is located within the saturation region of the second amplifier.

When the first amplification is performed, the first amplified signal may be inputted into the second amplifier to perform a second amplification (step 604). Since the minimum value of the first amplified signal obtained by the first amplification is located within the saturation region of the second amplifier, the amplification may be performed in the saturation region.

Linear amplification does not occur in the saturation region, and therefore the second amplified signal may be given the form of a uniform signal in which all signal levels are similar.

A coherent optical mixing may be performed for the optical signal split by the splitter and the second amplified signal that has undergone the second amplification (step 606). The second amplified signal may be used as the local oscillator signal of a conventional coherent optical communication system. Since the first optical signal and the second amplified signal are signals that have been split from the same signal, they have identical frequencies, making it possible to suppress the occurrence of frequency offsets.

When the optical mixing is performed, detection may be performed on the mixed optical signal (step 608). The optical signal detection can be performed by using a photodetector, etc.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A receiver device for a coherent optical communication system, the receiver device comprising:
    an optical splitter configured to split a received optical signal into at least two paths;
    a first amplifier configured to amplify a second optical signal of the at least two paths;
    a second amplifier configured to amplify a first output signal of the first amplifier; and
    a coherent receiver configured to produce a mixed signal by mixing a second output signal of the second amplifier and a first optical signal of the at least two paths and configured to perform detection on the mixed signal,
    wherein the first amplifier amplifies the second optical signal such that a minimum value of the first output signal of the first amplifier is within a saturation region of the second amplifier such that the second amplifier outputs the second output signal similar to a uniform signal.

2. The receiver device for the coherent optical communication system according to claim 1, wherein the first amplifier and the second amplifier comprises a semiconductor optical amplifier (SOA).

3. A receiving method in a coherent optical communication system, the method comprising:
 (a) splitting a received optical signal into at least two paths;
 (b) amplifying a second optical signal of the at least two paths;
 (c) amplifying a first output signal resulting from said step (b) by a second amplifier; and
 (d) mixing and detecting a second output signal resulting from said step (c) and a first optical signal of the at least two paths,
 wherein said step (b) amplifies the second optical signal such that a minimum value of the first output signal is within a saturation region of the second amplifier used in said step (c) such that the second output signal of said step (c) is a signal similar to a uniform signal.

* * * * *